April 1, 1930.  A. W. HARRISON  1,752,844
ELECTRIC SHOCK ABSORBER
Filed Dec. 19, 1928  3 Sheets-Sheet 1
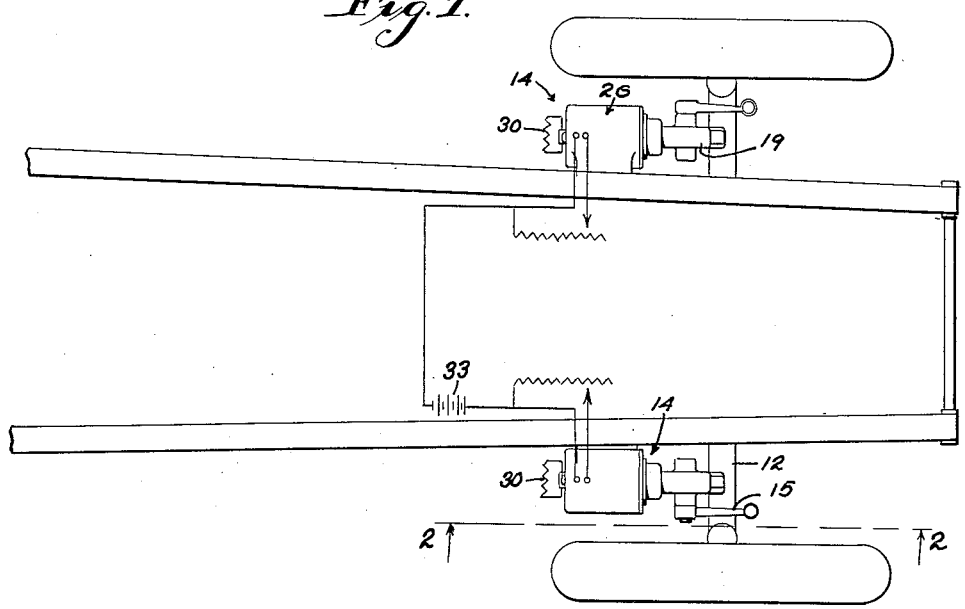
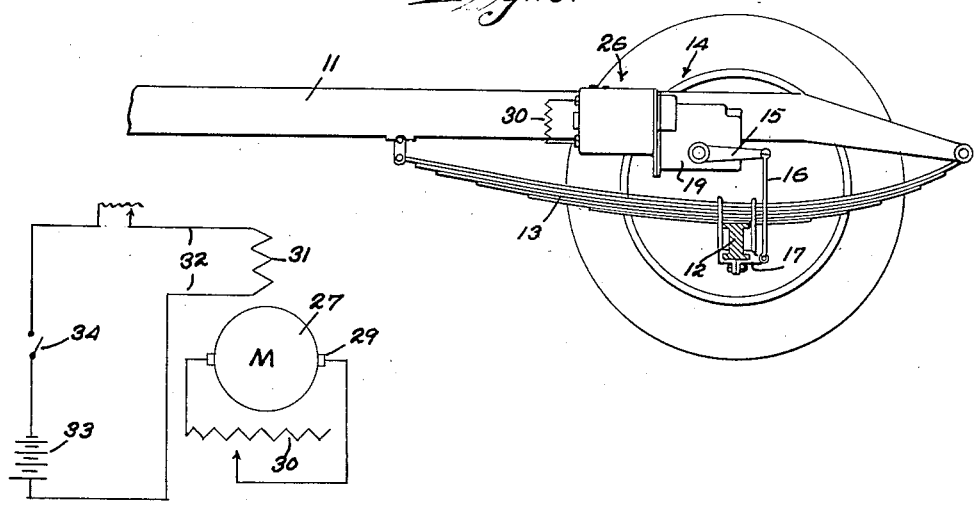

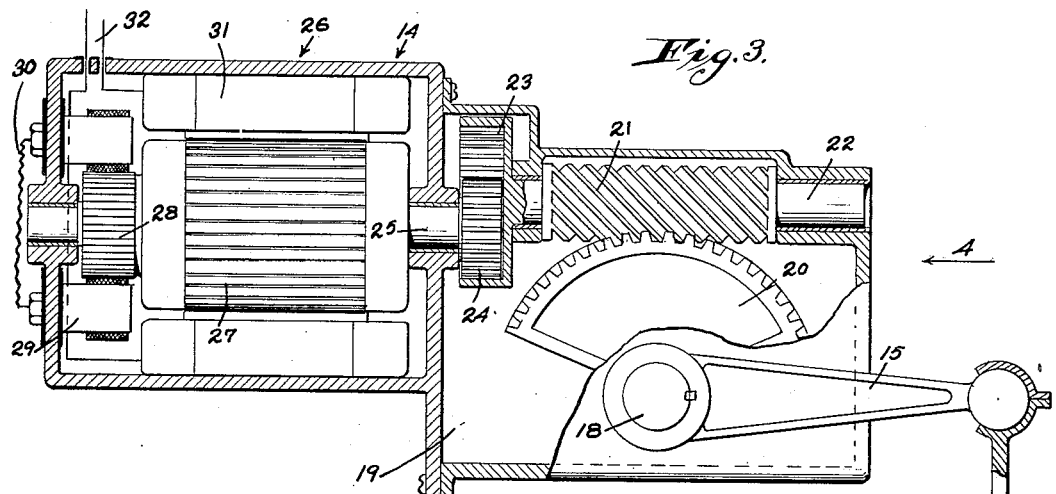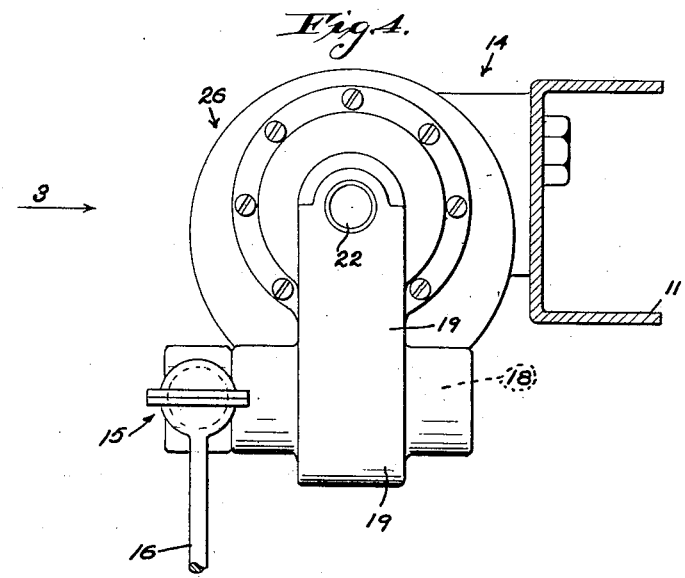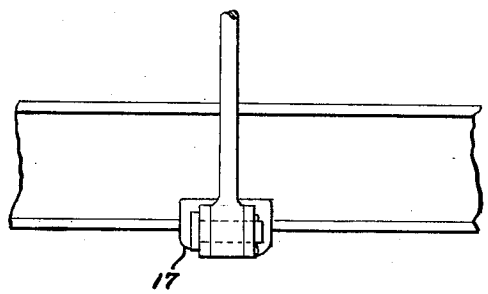

April 1, 1930.  A. W. HARRISON  1,752,844
ELECTRIC SHOCK ABSORBER
Filed Dec. 19, 1928  3 Sheets-Sheet 3
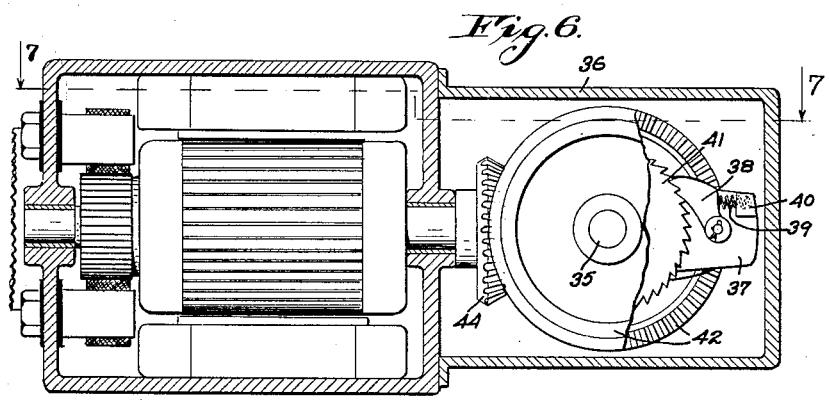
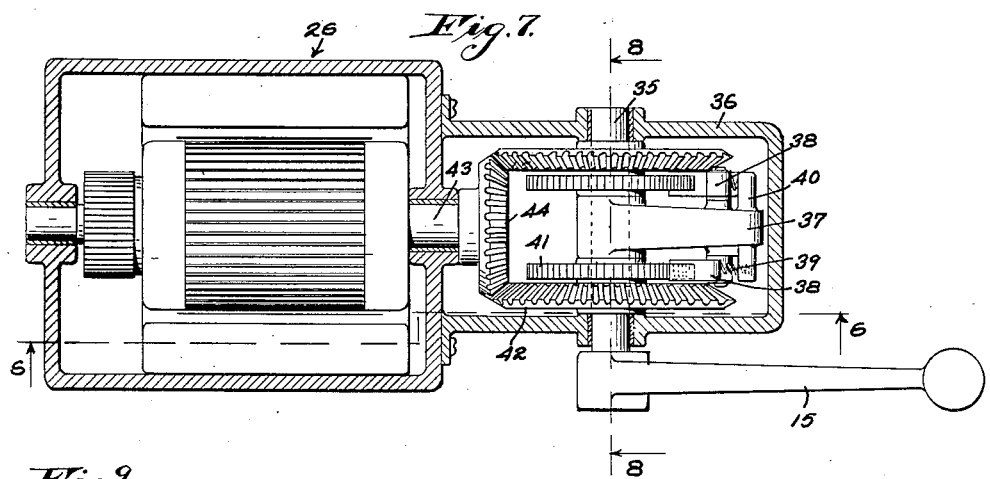
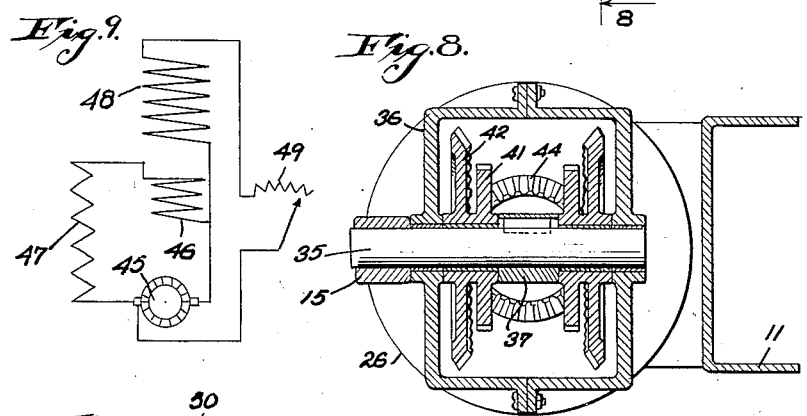
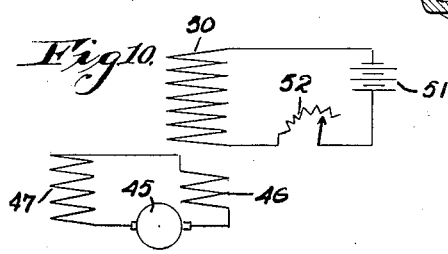
Inventor
A. W. Harrison.
by Hazard and Miller
Attorneys.

Patented Apr. 1, 1930

1,752,844

UNITED STATES PATENT OFFICE

ARTHUR W. HARRISON, OF LOS ANGELES, CALIFORNIA, ASSIGNOR OF ONE-HALF TO
L. D. KAY, OF LOS ANGELES, CALIFORNIA

ELECTRIC SHOCK ABSORBER

Application filed December 19, 1928. Serial No. 327,082.

My invention is an electric shock absorber especially adapted for motor vehicles.

An object of my invention is an electric shock absorber suitable for attachment to motor vehicles in which the spring action preferably in both directions of movement generates an electric current the current being passed through a resistor and thus causing resistance to the movement of the generator or other device creating the electric power. This resistance reacts against the springs and retards their movement.

A more specific object of my invention is to generate an electric current by a rotary generator or dynamo type of machine, the rotation of the generator being caused by the spring action of the vehicle. The current generated is passed through a resistor which causes a retardation of the movement of the rotary part of the generator. This reacts against the mechanism interconnecting the spring supported vehicle structure and the non-spring operated structure and gives a retardation to the movement of the springs.

Another detailed object of my invention is energizing the field coils of the generator with a battery current and utilizing a rotary armature driven by a gear train, this gear train being actuated in any suitable manner by the movement of a non-spring and spring suspended part of the vehicle. The armature in its rotation creates the current which passes through a load resistor and which resistance gives a retardation to the rotation of the armature and thus reacting through the transmission to retard the spring action and hence absorb the shock.

In one form of my invention I utilize a gear train which rotates in opposite directions in accordance with the separation or moving together of the spring hung part of the vehicle and the axles. This rotates the armature in opposite directions with a geared up motion, the armature current passing through the load resistor and thereby being retarded, hence retarding the action of the gears and absorbing the shocks of the spring action.

In another arrangement I may have the armature continuously driven in one direction and change the vertical reciprocating action of the body portion of the vehicle and the axle into a rotary motion by a double action type of mechanism.

My invention is illustrated in the accompanying drawings, in which;

Figure 1 is a plan indicating in diagram my invention mounted on the chassis of a vehicle;

Fig. 2 is a vertical section of Fig. 1 on the line 2—2;

Fig. 3 is a side elevation of the electric and gear train unit of my shock absorber taken in the direction of the arrow 3 of Fig. 4 with the casing or housing broken away showing the interior parts;

Fig. 4 is an end elevation of Fig. 3 taken in the direction of the arrow 4;

Fig. 5 is an electrical diagram of a suitable circuit for use with the construction of Figs. 1 through 5;

Fig. 6 is a longitudinal vertical section through a modification taken on the line 6—6 of Fig. 7 in the direction of the arrows, certain parts being shown broken away;

Fig. 7 is a longitudinal horizontal section taken on the line 7—7 of Fig. 6;

Fig. 8 is a vertical transverse section on the line 8—8 of Fig. 7 in the direction of the arrows;

Fig. 9 is an electrical diagram of a connection suitable for the construction of Figs. 6 through 8, showing a compound winding;

Fig. 10 is an electrical diagram of connections suitable for Figs. 6 through 8, showing the series and separate windings.

Referring particularly to Figs. 1, 2 and 3, the vehicle chassis or body construction is indicated by the numeral 11 and the axle by the numeral 12, these being connected by the springs 13. The electrical and gear train unit of my shock absorber designated generally by the numeral 14 is illustrated as clamped to the frame 11 and has an operating lever arm 15 connected by a link 16 to the axle by a clamp 17. By this construction as the springs react through the road bumps and the like the link causes an oscillating movement of the lever arm.

Referring to the construction shown in Figs. 3 and 4, the arm 15 is keyed to a shaft 18 which is journaled in the gear casing 19. This shaft has a segmental work gear 20 thereon which meshes with a steep-pitched worm 21 mounted on the longitudinal shaft 22. This shaft is journaled in the gear casing. The shaft 22 carries an internal gear 23 which meshes with the pinion 24. This pinion drives the armature shaft 25 which is journaled on opposite ends in the generator housing 26.

The armature 27 of the generator has its windings connected to the commutator 28 and by means of brushes 29 the current generated is led to a load resistor 30. The field coils 31 mounted in the generator housing are energized through the medium of the leads 32, these being connected to a source of power such as the battery.

Referring to the electrical diagram of Fig. 5, the armature is designated by the numeral 27 and the brush as 29 and the load resistor as 30, the field winding by the numeral 31 and the leads therefrom by the numeral 32, the source of power is indicated as the battery 33, there being a switch 34 in the circuit. It is desirable that the load resistor be variable and that the current to the field coils be also variable, when necessary.

The manner of operation of my shock absorber so far described is as follows:

When the springs are under action as when the vehicle is traveling over a rough road, it is manifest that the distance between the frame and the axle continuously varies. This as above mentioned gives a rocking motion to the lever arm 16 and hence an oscillating motion to the shaft 18 and to the worm gear 20. This worm gear transmits a rotary motion to the worm 21 in opposite directions and by the gear of transmission to the gears 23 and 24 the armature 27 is first rotated in one direction and then in the opposite direction. The amount of rotation will be varied in accordance with the amount of spring action. As the field coils are always energized a current will be generated by the rotation of the armature and this current passes through the load resistor 30.

The load on the generator gives a retarding effect to the rotation of the armature and this retarding effect acts through the armature shaft 25, the pinion 24 and the internal gear 23 of the geared up transmission. Hence this causes the worm 21 to exert a retarding action on the oscillation of the segmental gear 20 and of the shaft 18, hence retarding the oscillation of the lever arm 15 and resisting the spring action. Thus the electrical mechanism is caused to influence the reaction of the springs in the vehicle to road shocks, functioning as a shock absorber.

In the construction of Figs. 6, 7 and 8, the arm 15 is connected to a rock shaft 35 journaled in the gear case 36. This shaft has an arm 37 keyed thereto and such arm carries a pair of pawls 38 actuated by the springs 39 bearing against abutments 40. The pawls coact with ratchet gears 41 rotatably mounted on the shaft 35 and each of these ratchet gears has formed integrally therewith or connected to rotate therewith, a bevel gear 42. The teeth of the ratchets and pawls are reversed so that one will rotate in one direction and the other in the opposite direction.

The gear train comprises an armature shaft 43 journaled in the generator housing 26. With this construction, when the arm 15 oscillates due to the spring action of the vehicle, one of the pawls during the movement of the arm 37 in one direction will rotate one of the ratchets and hence one of the gears 42, thereby conveying a rotary motion to a bevel gear 44 on the shaft 43 and meshing with both of the gears. In the opposite direction of oscillation of the arm 15, the other pawl will rotate the other ratchet in the reverse direction to that of the first ratchet and drive the second gear 42 in the reverse direction to that of the first gear. Hence this second gear 42 will drive the bevel gear 44 in the same direction as the first gear. This gives a rotation in the same direction for the armature shaft 43 and hence the armature. Hence by this construction there is no reverse movement of rotation of the armature, but manifestly there is a variation in the speed of rotation.

In Fig. 9 the armature of the generator is designated by the numeral 45 and the series coil by the numeral 46. This is connected to the load resistance 47. There is also the shunt coil 48 connected to the coil 46 and operating through a field resistance 49 back to the armature. In the diagram of Fig. 10 showing a series and separate windings, the series coil, the armature and the load coil are in one circuit and the field coil 50 is in circuit with a battery 51, there being a field rheostat 52 in the circuit.

Various changes may be made in the principles of my invention without departing from the spirit thereof as set forth in the description, drawings and claims.

I claim:

1. An electric shock absorber comprising in combination an electric generator, means to actuate said generator due to the spring motion of a vehicle, a load resistor in the circuit of said generator, the load resistor acting against the operation of the generator and retarding the spring action.

2. An electric shock absorber comprising in combination an electric generator having energized fields and a rotatable armature, means to rotate the armature by the spring action of the vehicle, a load resistor in circuit with the armature, said load resistor retarding the rotation of the armature and thereby resisting the spring action.

3. An electric shock absorber comprising in combination an electric generator, a rotatable shaft, means to rotate said shaft by the spring action of the vehicle, said shaft operating the generator, a load resistor in the circuit of the generator, such load resistor resisting the rotation of the said shaft.

4. An electric shock absorber comprising in combination a rotary shaft, means to actuate the shaft from the spring action of a vehicle, an electric generator having energized fields and a rotatable armature driven by the said shaft, a load resistor in circuit with the armature, such resistor retarding the rotation of the armature and thereby creating a resistance to the rotation of the said shaft.

5. An electric shock absorber comprising in combination an electric generator, a rotatable shaft connected to operate the generator, a motion transmitting device between the spring hung part of the vehicle and the unspring-hung part to rotate the said shaft, a load resistor in circuit with the generator, said resistor retarding the operation of the shaft and resisting the action of the said motion transmitting device.

6. An electric shock absorber comprising in combination an electric generator having energized fields and a rotatable armature, a rotatable drive shaft operating the said armature, a motion transmitting device connected between a spring hung portion of the vehicle and an axle, to rotate the said shaft by the spring action of the vehicle, a load resistor in circuit with the generator, said resistor retarding the action of the shaft and resisting the movement of the motion transmitting device.

7. An electric shock absorber comprising in combination a generator housing having a gear case connected thereto, a generator adapted for connection to the spring hung frame of a vehicle, a generator in the housing, a shaft and a gear train in the gear case, the shaft operating the generator, a motion transmitting device between the shaft and the axle to rotate the shaft due to the spring action of the vehicle, a load resistor in circuit with the generator having a retarding action on the rotation of the shaft and hence resisting the movement of the motion transmitting device.

8. An electric shock absorber comprising in combination a generator housing having a gear case connected thereto adapted for attachment to the spring hung frame of a vehicle, fields and a rotatable armature in the housing, a rotatable drive shaft in the gear case having a speed up gear transmission to the armature, a motion transmitting device between the shaft and the axle to rotate the shaft due to the spring action of the vehicle, a load resistor in circuit with the armature, said load resistor retarding the rotation of the armature and hence resisting the motion of the motion transmitting device.

9. The method of absorbing road shocks in a vehicle comprising causing the relative movement of a spring hung and unspring hung portion of the vehicle to generate an electric current, resisting the generation of said current and thereby causing a resistance to the said relative motion.

10. The method of absorbing road shocks in a vehicle, comprising operating an electric generator by the relative motion of a spring hung and unspring hung portion of a vehicle, resisting the passage of the current generated and causing such resistance to retard the generator and hence the said relative motion.

11. The method of absorbing road shocks in a vehicle, comprising rotating the armature of an electric generator by the relative motion of a spring hung and unspring hung part of the vehicle, resisting the passage of the current generated in the armature circuit and generated thereby, such resistance causing a retarding of the armature action and resisting the said relative motion.

In testimony whereof I have signed my name to this specification.

ARTHUR W. HARRISON.